United States Patent [19]
Catherwood et al.

[11] Patent Number: 5,249,148
[45] Date of Patent: Sep. 28, 1993

[54] METHOD AND APPARATUS FOR PERFORMING RESTRICTED MODULO ARITHMETIC

[75] Inventors: Michael Catherwood; Greg Viot; James L. Broseghini, all of Austin, Tex.

[73] Assignee: Motorola, Inc., Schaumburg, Ill.

[21] Appl. No.: 617,725

[22] Filed: Nov. 26, 1990

[51] Int. Cl.⁵ .................................. G06F 7/38
[52] U.S. Cl. ...................................... 364/746
[58] Field of Search ............... 364/746, 736, 739, 786

[56] References Cited

U.S. PATENT DOCUMENTS

| | | | |
|---|---|---|---|
| 4,187,549 | 2/1980 | Bond et al. | 364/746 |
| 4,722,067 | 1/1988 | Williams | 364/746 |
| 4,742,479 | 5/1988 | Kloker et al. | 364/746 |

*Primary Examiner*—Jerry Smith
*Assistant Examiner*—Chuong D. Ngo

*Attorney, Agent, or Firm*—Jonathan P. Meyer; Susan C. Hill

[57] ABSTRACT

A digital data processor is capable of performing limited modulo arithmetic. The base, M, of the modulo arithmetic to be preformed by the processor must be equal to $2^X$, where X is an integer. The method and apparatus is particularly useful for generating addresses for a circular buffer or queue data structure and avoids both the large amount of hardware required for general modulo arithmetic and the software overhead associated with the use of linear arithmetic to generate modulo addresses. According to this method, X is represented as a first digital value. This representation of X is ANDed with a second digital data value (an offset). The result is then ADDed linearly with a third digital data value (a current address with the buffer). During this addition process, certain carry-out signals are inhibited from propagating, according to the digital representation of X.

19 Claims, 4 Drawing Sheets

| Circular buffer size (bytes) | MASK |
|---|---|
| 1 | 00000000 |
| 2 | 00000001 |
| 4 | 00000011 |
| 8 | 00000111 |
| 16 | 00001111 |
| 32 | 00011111 |
| 64 | 00111111 |
| 128 | 01111111 |
| 256 | 11111111 |

| Operation | Binary Value | Comments |
|---|---|---|
| (1) SIGN-EXTEND OFFSET | 1101<br>11111101 | OFFSET = -3 bytes (2's complement)<br>SOFFSET |
| (2) AND SOFFSET WITH MASK | 00111111 | MASK represents 64-byte circular buffer (from $09C40 to $09C7F)<br>SOFFSET & MASK |
| (3) ZERO-FILL SOFFSET & MASK | 00111101<br>0000000000000000111101 | [SOFFSET & MASK] |
| (4) ADD<br>OLD MODULO ADDRESS<br>plus<br>[SOFFSET & MASK]<br>equals<br>NEW MODULO ADDRESS | 0000100111000100 0001<br>+<br>0000000000000000 111101<br>―――――――――――――<br>0000100111000111 1110 | OLD MODULO ADDRESS = $09C41<br><br>[SOFFSET & MASK]<br><br>NEW MODULO ADDRESS = $09C7E |

*FIG. 3*

METHOD AND APPARATUS FOR PERFORMING RESTRICTED MODULO ARITHMETIC

FIELD OF THE INVENTION

The present invention relates, in general, to a method and apparatus for providing a restricted form of modulo arithmetic, where the modulo base must be a value equal to 2 to the power X, and where X must be an integer. More particularly, the invention relates to a method and apparatus using a restricted form of modulo arithmetic for supporting a circular buffer or queue with minimal hardware and without the overhead associated with software boundary tests.

BACKGROUND OF THE INVENTION

Digital signal processing (DSP) is broadly defined as any digital operation performed on an input sequence of numbers. The sequence of numbers can represent a wide range of data, from simple data such as daily temperatures to complex data such as digitized samples of a human voice. DSP can be used for a variety of purposes, such as, for example, digital filtering, determining the presence of a periodic signal, determining the periodic frequency content of a signal, generating sinusoidal waveforms, and replacing analog circuitry with a DSP software equivalent.

A very useful and common mathematical operation in DSP systems is the "multiply and accumulate" or "MAC" operation. For example, digital filtering can be accomplished with multiply and accumulate operations using current and past digital values of the data multiplied by filter coefficients. The values of the filter coefficients determine the characteristics of the filter, such as lowpass, highpass, bandpass, etc. As each digital value is multiplied by the corresponding filter coefficient, the resulting product is added to the sum of all of the prior products. Although the multiply and accumulate operation is relatively simple, the number of MAC operations required to perform a useful DSP function, such as digital filtering, is potentially very large. Thus, methods which reduce the time and software overhead required to perform basic DSP operations are very important.

Circular buffers or queues are often used to implement a digital filter. While one queue holds the digital values of periodic samples of the signal to be filtered, another queue holds the values of the filter coefficients. Modulo arithmetic os commonly used to perform address calculations for circular buffers. The address calculations are performed on integer values, and the resulting address is used to access data contained in a data storage device. Data storage devices are typically implemented by conventional memory circuits having linear addressing capability.

Linear arithmetic is an arithmetic form commonly found in data processors and is typically implemented by conventional two's complement binary arithmetic. However, there is a considerable amount of software overhead associated with using linear arithmetic to implement memory data structures such as circular buffers, queues, or FIFOs. This extra overhead is due to the fact that linear arithmetic has no ability to directly perform a "wraparound" operation to maintain an address within a defined range. Modulo arithmetic, on the other hand, directly performs a wraparound function with no overhead. Thus, modulo arithmetic allows data structures such as circular buffers, queues, and FIFOs to be implemented with less overhead than is required by linear arithmetic.

In an abstract mathematical sense, "modulo M" arithmetic uses a number system to the base M where each digit of the number system is represented by a predetermined value within a range from 0 thru (M−1), where M is an integer. A representation of "(N)modulo M" is essentially equal to the "remainder" of N to the base M. For example, the representation (12)modulo 10 is equal to 2. As calculations of (R±N)modulo M are preformed on numbers R and N, which each are within a range from 0 thru (M−1), the resultant must also be a number within the defined range. If a lower boundary value, L, of the range is not equal to zero, a modulo value resulting from an arithmetic calculation is no longer literally equal to a remainder value. The resultant is offset from 0 by the value of the lower boundary L and the modulo arithmetic calculation becomes equal to:

$$[(R \pm N - L) \bmod M] + L.$$

Existing modulo addressing schemes, although very flexible, require a significant amount of hardware. As the demand for higher performance microcontrollers (MCUs) increases, semiconductor manufacturers are looking for ways to design MCUs with as much functionality as possible within the confines of a small amount of circuitry and silicon area. MCUs have developed to the point where it is desirable for them to have the ability to perform basic DSP functions. The primary trade-off in designing circuitry to perform DSP functions is the trade-off between silicon area on the one hand, and speed and flexibility on the other hand. Generally, the more steps of a DSP algorithm that are implemented in hardware rather than software, the faster the DSP algorithm can be performed, but the more silicon area that must be used. Also, the more flexibility that the user is provided in terms of parameters that can be user programmed for the DSP algorithm, the more silicon area that is required.

The present invention does not have as much flexibility as most dedicated DSP processors because the present invention reflects this trade-off between silicon area on the one hand, and speed and flexibility on the other hand. The present invention only allows modulo base values (M) equal to 2 to the power X, where X is an integer; whereas, most dedicated DSP processors allow the user to program a wider range of modulo values. However, this invention requires very little dedicated silicon area in an MCU. The present invention gives the user a limited, but very useful ability to do DSP processing with a minimal cost in terms of silicon area.

SUMMARY OF THE INVENTION

The present invention comprises a processor system for processing digital data including apparatus for receiving a first bit field, apparatus for receiving a second bit field, first logic for performing an AND logic function, and second logic for performing an arithmetic addition. The first bit field represents a modulo base value. The modulo base value (M) must be a value equal to 2 to the power X, and X must be an integer. The second bit field represents an offset value. The first logic logically ANDs a predetermined bit of said first bit field and a predetermined bit of said second bit field for a predetermined portion of the bits of said first and second bit fields to produce a first output signal. The second logic then arithmetically adds the first output signal to an address value to produce a new address value. The second logic also inhibits a carry-out from one or more predetermined bit locations of the new address value, if a carry-out is generated.

The present invention will be understood by one skilled in the art from the detailed description below.

BRIEF DESCRIPTION OF THE DRAWINGS

FIG. 3 illustrates in tabular form an example of the computations required to perform modulo arithmetic using one embodiment of the present invention;

DESCRIPTION OF THE PREFERRED EMBODIMENT

The symbol "%" will be used when referring to a binary number and the symbol "$" will be used when referring to a hexadecimal number. The following description assumes, in most instances, a memory system organized as a byte-wide system. That is, each addressable location in the memory contains one byte, or eight bits, of data. As is apparent, many memory systems are organized differently, using words (two bytes), long words (four bytes) or some other unit as the size of each addressable location. Therefore, all references in the following description to a number of bytes or the like should be interpreted as exemplary only and as including the possibility of variations in the number of bits stored at each addressable location.

Figures 1, 2:
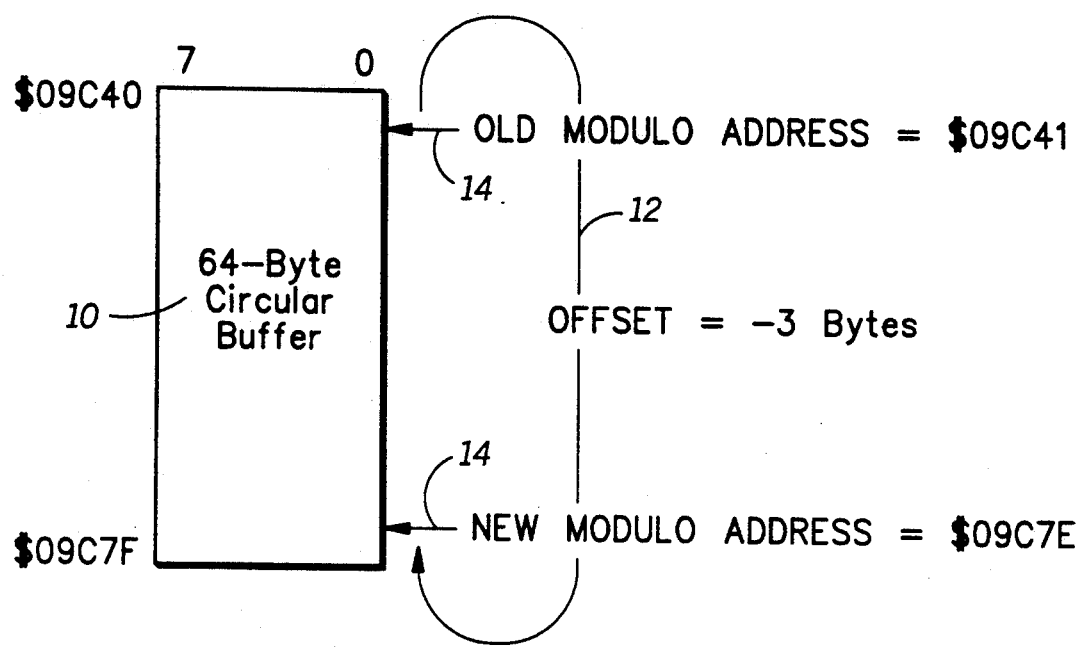
FIG. 1 illustrates in block diagram form an example of how the results of modulo arithmetic computations can be used to address a circular buffer.
FIG. 2 is a table showing the correlation between the size of the circular buffer and the value of the address mask.

Referring to FIG. 1, the block diagram illustrates an example of how modulo arithmetic can be used to address a circular buffer 10. Although the circular buffer 10 in this example contains 64 bytes, any size buffer could be used with the present invention, as long as the number of bytes in the buffer was a power of two. Thus, the only limitation on buffer size is that the number of bytes in the buffer must be a value equal to 2 to the power X, where X must be an integer. However, for convenience, the preferred embodiment of the present invention arbitrarily limits the size of the circular buffer 10 to a maximum of 256 bytes. Also, although the circular buffer 10 in this example is arbitrarily shown as one byte wide, there is no requirement as to the width of the circular buffer 10. The circular buffer 10 could be word wide, long word wide, or any number of bytes wide. The example in FIG. 1 uses a 64 byte circular buffer 10 which has a lower boundary at address $09C40 and an upper boundary at address $09C7F. By convention, FIG. 1 shows addresses increasing in numerical value in the downward direction on the page.

Unlike linear arithmetic, modulo arithmetic directly performs a "wraparound" operation which is indicated by the wraparound arrow 12. In the normal operation of a system containing a circular buffer 10, there is a pointer 14 which points to the location in the circular buffer 10 which is to be accessed. This pointer 14 is a variable which contains the address of the next circular buffer 10 location which is to be accessed. In this example, the pointer 14 originally points to address location $09C41 because the buffer has just been accessed at that address. Address $09C41 is therefore called the "OLD MODULO ADDRESS" in this example.

In the normal operation of a system containing a circular buffer 10, the pointer 14 is moved using modulo arithmetic to the next address by adding eitger a positive or negative offset and, when necessary, by wrapping around the lower boundary or upper boundary of the circular buffer 10. Of course, adding a negative offset could be achieved instead by subtracting a positive offset of the same magnitude. The present invention places no limitation on the sign or magnitude of the offset. However, in the preferred embodiment of the present invention, the magnitude and sign of the offset are specified using only four bits of a microprocessor instruction, and therefore the value of the offset in the preferred embodiment must be an integer between $-8$ and 7 inclusive.

In most applications, the required magnitude of the offset is usually determined by the number of bytes used to represent the prior piece of data contained within the circular buffer 10. In this example, the piece of data which starts at address location $09C41 occupies three bytes, namely the bytes at address locations $09C41, and $09C7F. Therefore, the offset must have a magnitude equal to three in order to move the pointer 14 to $09C7E, which is the starting address location of the next byte of data. Note, however, that there may be other factors which are used to determine the required magnitude of the offset.

The sign, positive or negative, of the offset is used to determined the direction in which the pointer 14 will move. There are only two possibilities. Either the pointer 14 will move up the circular buffer 10 from higher addresses to lower addresses and wraparound from the top to the bottom; or else the pointer 14 will move down the circular buffer 10 from lower addresses to higher addresses and wraparound from the bottom to the top. In the preferred embodiment, a negative offset causes the pointer 14 to move up the circular buffer 10 from higher addresses to lower addresses and wraparound from the top to the bottom, which is the case shown in the example; and a positive offset causes the pointer 14 to move down the circular buffer 10 from lower addresses to higher addresses and wraparound from the bottom to the top. In this example, the old modulo address is $09C41, which is near the top of the buffer. Performing modulo arithmetic using an offset of $-3$ bytes therefore causes the pointer 14 to wraparound from the top to the bottom of the circular buffer 10. Note that negative offsets are represented in 2's complement form.

Referring to FIG. 2, the information in this table is used in the computations which are required to perform modulo arithmetic using one embodiment of the present invention. An example of these computations are shown in FIG. 3. Although any size circular buffer 10 could be used with the present invention as long as the number of bytes is a power of two, the preferred embodiment of the present invention arbitrarily limits the size of the circular buffer 10 to a maximum of $2^8$ bytes or 256 bytes.

Still referring to FIG. 2, the binary value of the MASK indicates the size or number of bytes in the circular buffer 10 as shown in the table. Of course, the size of the circular buffer is the same as the base for the modulo arithmetic which is used for calculating addresses within the buffer. In this particular example a 64 byte circular buffer 10, which corresponds to a MASK binary value of %00111111, is being used. For buffer sizes larger than $2^8$ bytes, the binary representation of MASK would require more than 8 bits. A buffer size of $2^X$ bytes requires that X bits be used for the binary representation of MASK. For example, a buffer size of $2^{12}$ bytes would require 12 bits for the binary representation of MASK, and MASK would equal %111111111111. If the buffer size being used is $2^L$ bytes, which is smaller than the maximum buffer size $2^X$ bytes, then the lowest L bits in MASK must all equal "1", and the remaining upper bits must all equal "0". For example, if the maximum buffer size is still $2^{12}$ bytes, but the buffer size being used is $2^{10}$ bytes, MASK equals %001111111111. As is apparent from the foregoing discussion, it is the choice of representing the modulo base as a mask in the manner shown in FIG. 2 which restricts the modulo base to integral powers of 2.

The modulo arithmetic method described in FIG. 3 and using the MASK values in FIG. 2 is valid for generating addresses for any circular buffer which has a lower boundary at an address in which the lower L bits are equal to 0. In other words, the lower boundary of an $2^L$ byte circular buffer may be located on any $2^L$ byte boundary within the memory space. Of course, the method described performs accurate modulo arithmetic regardless of the value of the starting address, but it is useful for generating addresses within a circular buffer only if the lower boundary of the circular buffer meets the criterion stated above.

Referring to FIG. 3, the table illustrates an example of the computations required to perform modulo arithmetic using one embodiment of the present invention. The same values from FIG. 1 are used. These calculations assume a 64 byte circular buffer with a MASK value of %00111111, a lower boundary at an address of $09C40 and an upper boundary at an address of $09C7F. The old modulo address is $09C41, which is near the top of the circular buffer 10. The offset is −3.

The first operation performed by the preferred embodiment of the present invention is to sign-extend OFFSET to the same length as MASK. OFFSET represents the number of address locations the pointer 14 is to be moved. Positive offsets are simply represented by their binary value (i.e. an offset of 3 is represented in the preferred embodiment by OFFSET=%0011). Negative offsets are represented by their two's complement binary value (i.e. an offset of −3 is represented by %1101). In the preferred embodiment OFFSET is 4 bits long, but the present invention does not place any length restriction on OFFSET. OFFSET could be any number of bits. MASK represents the size or number of bytes in the circular buffer 10. In the preferred embodiment MASK is 8 bits long, but the present invention does not place any length restriction on MASK. MASK could be any number of bits. If MASK has more bits than OFFSET, as in the preferred embodiment, then OFFSET must be sign-extended to have the same number of bits as MASK. And correspondingly, if OFFSET had more bits than MASK, then MASK must be zero-filled to have the same number of bits as OFFSET. The sign-extended value of OFFSET is called SOFFSET.

The second operation performed by the preferred embodiment of the present invention is to logically "AND" SOFFSET with MASK. SOFFSET equals %11111101, and MASK equals %00111111. The result of ANDing SOFFSET with MASK equals %00111101.

The third operation performed by the preferred embodiment of the present invention is to zero-fill the result produced by ANDing SOFFSET with MASK. The zero-filled result, labeled [SOFFSET & MASK], equals %00000000000000111101. The purpose of the zero-filling is to make the number of bits in [SOFFSET & MASK] equal to the number of bits required by the ALU 66 in FIG. 5. This zero-filling would not be required if the result produced by ANDing SOFFSET with MASK was the same number of bits as the ALU 66, or if the ALU 66 had the ability to operate on operands of varying length. The only purpose of the zero-filling is to make the operand 20 bits long to match the 20 bit ALU 66.

The fourth operation performed by the preferred embodiment of the present invention is to add the [SOFFSET & MASK] binary value %00000000000000111101 to the OLD MODULO ADDRESS binary value %00001001110001000001. The result of the addition is the NEW MODULO ADDRESS %00001001110001111110.

It is important to note that the first operation (i.e. the sign-extension of OFFSET) and the third operation (i.e. the zero-filling of OFFSET & MASK) are only required by the preferred embodiment of the present invention. Other embodiments of the present invention may not require these two operations.

Figure 4:
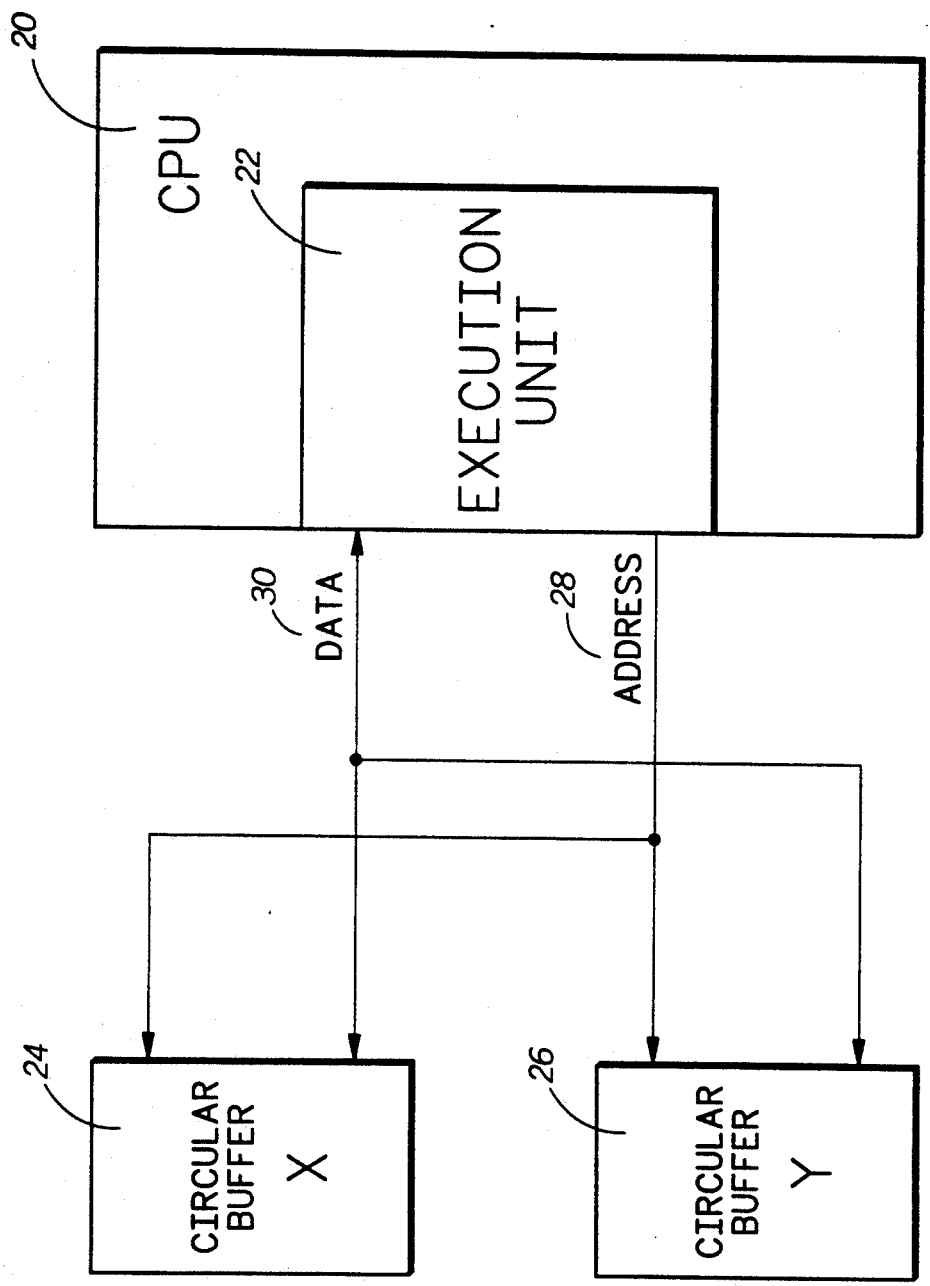
FIG. 4 illustrates in block diagram form, one embodiment of a circular buffer and a modulo arithmetic addressing scheme in accordance with the present invention.

Referring to FIG. 4, the block diagram illustrates one embodiment of a system to perform DSP filtering algorithms. The system uses a modulo arithmetic addressing scheme in accordance with the present invention and two circular buffers. Normally, one of the circular buffers is used to contain the data samples, and the other circular buffer is used to contain the filter coefficients. The central processing unit CPU 20 contains an execution unit 22 that performs the modulo arithmetic. The results of the modulo arithmetic are used to address the circular buffer-X 24 and the circular buffer-Y 26. ADDRESS 28 is the path used by the execution unit to transmit address information to the two circular buffers 24 and 26. DATA 30 is the path used by the system to transmit data back and forth between the execution unit 22 and the two circular buffers 24 and 26.

Figure 5:
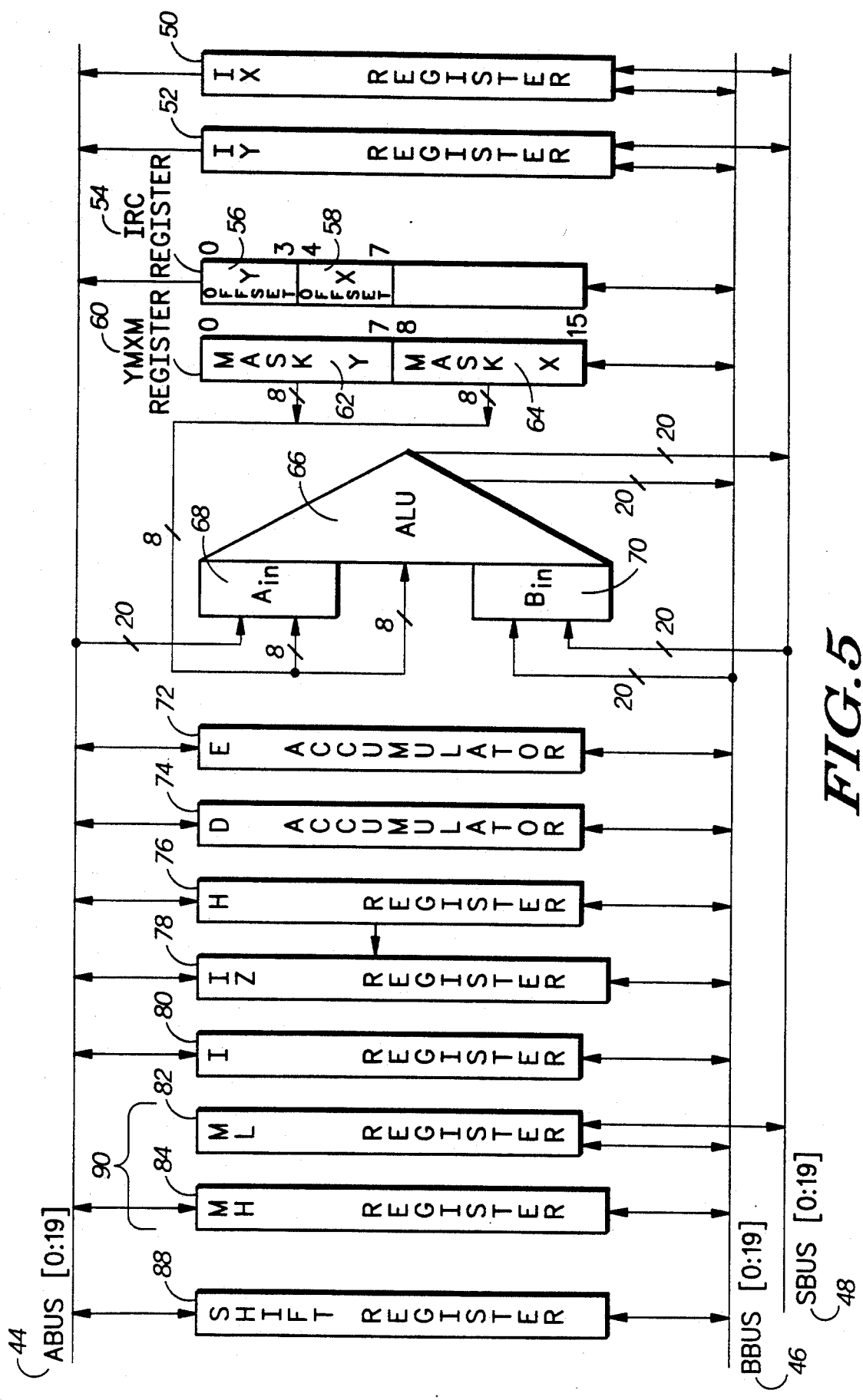
FIG. 5 illustrates in block diagram form, one embodiment of a modulo arithmetic circuit in accordance with the present invention.

Referring to FIG. 5, the block diagram illustrates one embodiment of a modulo arithmetic circuit in accordance with the present invention, along with the associated circuitry required to implement digital signal processing (DSP) algorithms. In the present embodiment, the circuitry shown in FIG. 5 is contained within the execution unit 22 shown in FIG. 4. The block diagram in FIG. 5 shows a set of registers and accumulators, an arithmetic logic unit (ALU) 66, and three buses which allow communications between logic elements within and outside of the execution unit 22.

The "multiply and accumulate" or MAC instruction which is a part of the instruction set of CPU 20 performs a very useful and common mathematical operation which is a basic building block for various DSP algorithms. For example, digital filtering can be accomplished with multiply and accumulate operations using current and past digital values of the data multiplied by filter coefficients. The values of the filter coefficients determine the characteristics of the filter, such as lowpass, highpass, bandpass, etc. As each digital value is multiplied by the corresponding filter coefficient, the resulting product is added to the sum of all of the prior products. In the preferred embodiment, the MAC instruction multiplies two 16 bit signed fractional numbers together resulting in a 32 bit signed fixed point product, which is then added to a 36 bit accumulator to keep a running sum of the products.

A portion of the circuitry in FIG. 5 is used during the MAC instruction to perform modulo arithmetic in order to generate addresses for accessing the circular buffers. To illustrate the operation of the circuitry in FIG. 5, the steps required to execute a MAC instruction will be described. For illustrative purposes, the circuitry in FIG. 5 will be considered as a portion of the execution unit 22 shown in FIG. 4. Also for illustrative purposes, circular buffer-X 24 will be assumed to contain data samples, and circular buffer-Y 26 will be assumed to contain the corresponding filter coefficients.

Referring to both FIG. 4 and FIG. 5, in order for the MAC instruction to execute as desired, the user must properly initialize some of the registers in FIG. 5 before executing the MAC instruction. First, the user must load the value of the starting address of circular buffer-X 24 into the IX register 50, and the value of the starting address of circular buffer-Y 26 into the IY register 52. Second, the user must execute the LDHI instruction. The LDHI instruction loads the H register 76 from the starting address in the circular buffer-X 24 using the IX register 50 as the pointer 14 (see FIG. 2), and loads the I register 80 from the starting address in the circular buffer-Y 26 using the IY register 52 as the pointer 14. Now the IX register 50 and the IY register 52 contain the old pointer 14 value called the OLD MODULO ADDRESS. Among other tasks, the MAC instruction is responsible for updating the pointer 14 value to point to the NEW MODULO ADDRESS. The present invention for performing modulo arithmetic is used during the MAC instruction to update the pointer 14 value to point to the NEW MODULO ADDRESS.

Continuing the initialization, third, the user must load the D accumulator 74 with two MASK values, one for circular buffer-X 24 and one for circular buffer-Y 26. Note that the two MASK values do not have to be the same value. Although this embodiment uses only two MASK values, other embodiments could use any number of MASK values. In addition, although the two MASK values in the preferred embodiment are the same number of bits in length, other embodiments could use MASK values with varying numbers of bits. Each MASK value corresponds to the size of its circular buffer as shown in FIG. 2.

Finally, the user must execute the TDMSK instruction. The TDMSK instruction transfers the two MASK values from the D accumulator 74 to the YMXM register 60. The MASK value for circular buffer-X 24, called MASK-X 64, is now located in bits 8 through 15 of the YMXM register 60. The MASK value for circular buffer-Y 26, called MASK-Y 62, is now located in bits 0 through 7 of the YMXM register 60.

Although the register initialization has been described above as four sequential steps, the only requirement in terms of implementation order is that step 1 must be performed before step 2, and step 3 must be performed before step 4. Once the four register initialization steps have been completed, the user is ready to execute the MAC instruction.

When the previous instruction is completed, the logic within the execution unit 22 causes the binary value of the MAC instruction to be loaded into the IRC register 54. The IRC register 54 is the last register in a pipeline of registers used to hold instructions. Note that the remaining registers in the instruction pipeline are not shown in FIG. 5 because they are not required to perform the functions specified by the MAC instruction. During execution of the MAC instruction, the IRC register 54 itself contains, among other things, two offset values. The offset value for circular buffer-X 24, called OFFSET-X 58, is located in bits 4 through 7 of the IRC register 54. The offset value for circular buffer-Y 26, called OFFSET-Y 56, is located in bits 0 through 3 of the IRC register 54. In the preferred embodiment of the present invention the offset values are provided as bit fields within the instruction itself, as described above. However, it is possible to modify the preferred embodiment so that the instruction itself simply specifies the locations of values (for instance, in particular registers or memory locations) which are to be used as the offset values. This would have the advantage of being a dynamic specification of the offset values rather than a static specification, as is the preferred embodiment.

The following discussion will describe in general how the execution unit 22 performs modulo arithmetic and executes the MAC instruction. The present invention is used to perform the modulo arithmetic, and the modulo arithmetic computations are a critical component of the MAC instruction. At the beginning of the MAC instruction, the execution unit 22 uses the present invention to perform modulo arithmetic to add an offset to the address used to access the circular buffer-X 24 and to add an offset to the address used to access the circular buffer-Y 26. These NEW MODULO ADDRESSes are sent one at a time across ADDRESS 28 in order to access one of the circular buffers 24 or 26.

The order in which the execution unit 22 performs the steps in the MAC instruction is as follows. First, the execution unit 22 uses modulo arithmetic to compute NEW MODULO ADDRESS-X, which is the address that points to the next location to be accessed in circular buffer-X 24. Second, the execution unit 22 sends the NEW MODULO ADDRESS-X out across ADDRESS 28 to access the circular buffer-X 24. Third, the execution unit 22 uses modulo arithmetic to compute NEW MODULO ADDRESS-Y, which is the address that points to the next location to be accessed in circular buffer-Y 26. Fourth, the execution unit 22 sends the NEW MODULO ADDRESS-Y out across ADDRESS 28 to access the circular buffer-Y 26. And finally, the execution unit 22 multiplies the operands, one from circular buffer-X 24 and one from circular buffer-Y 26, which had been previously placed in the appropriate registers. Also, while the multiply is being performed by the execution unit 22, the new operands are received and stored in the appropriate registers. One operand is received from circular buffer-X 24, and the other operand is received from circular buffer-Y 26. These operands are stored in the appropriate registers so that they can be multiplied during the next MAC instruction. This overlapping of the execution of one multiply-and-accumulate cycle with the fetching of data to be used in the next cycle is not a feature of the present invention, but is simply a mechanism for speeding up the execution of repetitive operations.

Still referring to both FIG. 4 and FIG. 5, the following discussion will describe in more detail how the execution unit 22 performs modulo arithmetic and executes the MAC instruction. Once the binary value of the MAC instruction is loaded into the IRC register 54, then the execution unit 22 can begin to perform the functions specified by the MAC instruction. The two offsets, OFFSET-X 58 and OFFSET-Y 56, located in bits 0 through 7 of the IRC register 54, are transferred to Ain 68 across ABUS[0:7] 44. Logic within Ain 68 selects the bits representing OFFSET-X 58 from ABUS[4:7] 44 and moves these four bits to the least significant bits, bits 0-3 within Ain. Logic within Ain 68 then sign-extends the most significant bit, which is bit 3 in the preferred embodiment. This sign-extension is the first operation listed in the table in FIG. 3. The result of the sign-extension of the offset is labeled "SOFFSET-X". This sign-extension is only required if the offset contains fewer bits than the mask. Although OFFSET-X 58 need only be sign-extended to 8 bits to match the number of bits in MASK-X 64, the preferred embodiment arbitrarily sign-extends the offset to 20 bits, however the most significant 12 bits are not used. This is due only to the fact that the ALU 66 normally operates on 20 bit data.

Continuing with the functions specified by the MAC instruction, MASK-X 64 is transferred from bits 8 through 15 of the YMXM register 60 to both the input of Ain 68, as the least significant 8 bits, and to the control logic of the ALU 66. The 8 bit MASK-X 64 and the lowest 8 bits of SOFTSET-X are logically ANDed together within Ain 68. The choice to perform this operation within Ain 68 rather than with the normal ALU 66 logic was simply driven in the preferred embodiment by speed considerations. This ANDing is the second operation listed in the table in FIG. 3. The most significant 12 bits out of the 20 bit Ain 68 input to the ALU 66 are driven to zero. This zero-filling is the third operation listed in the table in FIG. 3. The 20 bit, zero-filled result of ANDing SOFFSET-X and MASK-X 64, labeled "[SOFFSET-X & MASK-X]", is then added to the 20 bit OLD MODULO ADDRESS-X using the ALU 66 to perform the addition. The OLD MODULO ADDRESS-X for circular buffer-X 24 is stored in IX register 50. The contents of IX register 50, which is the pointer 14 (see FIG. 2) for circular buffer-X 24, is transferred to Bin 70 across BBUS[0:19]46.

When [SOFFSET-X & MASK-X] is added to the OLD MODULO ADDRESS-X, the 8 bits of MASK-X 64 input to the control logic of the ALU 66 are used internally by the ALU 66 to affect the propagation of carry-outs produced by the ALU 66 circuitry. The ALU 66 circuitry prevents the propagation of a carry-out beyond the most significant bit which is set in MASK-X 64. For illustration, in the example shown in the table in FIG. 3, the mask value is %00111111. Therefore, the ALU 66 circuitry will prevent the propagation of a carry-out beyond bit 5, which is the most significant bit set in MASK-X 64 (note that, by convention, the least significant bit is designated bit 0, not bit 1). So no carry-out is allowed to propagate from bit 5 to bit 6. Note that in the preferred embodiment, all MASK-X 64 bits above the most significant set bit will always be zero. Therefore, in the preferred embodiment, there is no possibility of a carry-out occurring beyond the most significant set bit of MASK-X 64 (say, between bit 6 and bit 7 in the example). The inhibiting of the carry-out is part of the wraparound feature which prevents the modulo address from incrementing or decrementing beyond the boundaries of the circular buffer-X 24.

The inhibition of the propagation of the carry-out signal in the ALU 66 is a simple matter of providing AND gates controlled by the MASK bits between successive stages of the ALU 66. The output of each AND gate is 1 or 0, depending on the state of the carry-out signal from the preceding stage, if the MASK bit is equal to 1. If the MASK bit is equal to 0, the output of the AND gate is equal to 0 regardless of the state of the carry-out signal. The output of the AND gate is coupled to the carry-in input of the succeeding stage. For instance, in an ALU which uses simple carry logic (as opposed to carry-look-ahead logic), each bit of the MASK value would control an AND gate located in the carry-out propagation path between the corresponding bit of the ALU and the next succeeding bit of the ALU. That is, bit 5 of the MASK would control an AND gate located between bits 5 and 6 in the ALU. In the case of an ALU which is designed according to carry-look-ahead principles, AND gates in each of the several possible carry-in paths to a given stage of the ALU will be required.

The NEW MODULO ADDRESS-X is the 20 bit result produced when [SOFFSET-X & MASK-X] is added to the OLD MODULO ADDRESS-X. The NEW MODULO ADDRESS-X is transferred from the ALU 66 to the IX register 50 across SBUS[0:19] 48. The IX register 50 is still the pointer 14 for circular buffer-X 24. The NEW MODULO ADDRESS-X is also driven externally across ADDRESS 28 (see FIG. 4) in order to access the circular buffer-X 24 so as to retrieve a new data operand.

At this point in the MAC instruction, the execution unit 22 has used the present invention to perform modulo arithmetic to add an offset to the address used to access the circular buffer-X 24. The execution unit 22 has sent the NEW MODULO ADDRESS-X out to the circular buffer-X 24, but the data from the buffer has not yet been received by the execution unit 22.

The execution unit 22 now repeats the same steps to access the circular buffer-Y 26. The two offsets, OFFSET-X 58 and OFFSET-Y 56, located in bits 0 through 7 of the IRC register 54, are transferred to Ain 68 across ABUS[0:7] 44. Logic within Ain 68 selects the bits representing OFFSET-Y 56 from ABUS[0:3] 44 and moves these four bits to the least significant bits, bits 0-3 within Ain 68. Logic within Ain 68 then sign-extends the most significant bit, which is bit 3 in the preferred embodiment. This sign-extension is the first operation listed in the table in FIG. 3. The result of the sign-extension of the offset is labeled "SOFFSET-Y". This sign-extension is only required if the offset contains fewer bits than the mask. Although OFFSET-Y 56 need only be sign-extended to 8 bits to match the number of bits in MASK-Y 62, the preferred embodiment arbitrarily sign-extends the offset to 20 bits, however the most significant 12 bits are not used.

Continuing with the functions specified by the MAC instruction, MASK-Y 62 is transferred from bits 0 through 7 of the YMXM register 60 to both the input of Ain 68, as the least significant 8 bits, and to the control logic of the ALU 66. The 8 bit MASK-Y 62 and the lowest 8 bits of SOFFSET-Y are logically ANDed together within Ain 68. This ANDing is the second operation listed in the table in FIG. 3. The most significant 12 bits out of the 20 bit Ain 68 input to the ALU 66 are driven to zero. This zero-filling is the third operation listed in the table in FIG. 3. The 20 bit, zero-filled result of ANDing SOFFSET-Y and MASK-Y 62, labeled "[SOFFSET-Y & MASK-Y]", is then added to the 20 bit OLD MODULO ADDRESS-Y using the ALU 66 to perform the addition. The OLD MODULO ADDRESS-Y for circular buffer-Y 26 is stored in IY register 52. The contents of IY register 52, which is the pointer 14 (see FIG. 2) for circular buffer-Y 26, is transferred to Bin 70 across BBUS[0:19] 46.

When [SOFFSET-Y & MASK-Y] is added to the OLD MODULO ADDRESS-Y, the 8 bits of MASK-Y 62 input to the control logic of the ALU 66 are used internally by the ALU 66 to affect the propagation of carry-outs produced by the ALU 66 circuitry. The ALU 66 circuitry prevents the propagation of a carry-out beyond the most significant bit which is set in MASK-Y 62. For illustration, in the example shown in the table in FIG. 3, the mask value is %00111111. Therefore, the ALU 66 circuitry will prevent the propagation of a carry-out beyond bit 5, which is the most significant bit set in MASK-Y 62. So no carry-out is allowed to propagate from bit 5 to bit 6. Note that in the preferred embodiment, all MASK-Y 62 bits above the most significant set bit will always be zero. Therefore, in the preferred embodiment, there is no possibility of a carry-out occurring beyond the most significant set bit of MASK-Y 62. The inhibiting of the carry-out is part of the wraparound feature which prevents the modulo address from incrementing or decrementing beyond the boundaries of the circular buffer-Y 26.

The NEW MODULO ADDRESS-Y is the 20 bit result produced when [SOFFSET-Y & MASK-Y] is added to the OLD MODULO ADDRESS-Y. The NEW MODULO ADDRESS-Y is transferred from the ALU 66 to the IY register 52 across SBUS[0:19] 48. The IY register 52 is still the pointer 14 for circular buffer-Y 26. The NEW MODULO ADDRESS-Y is also driven externally across ADDRESS 28 (see FIG. 4) in order to access the circular buffer-Y 26 so as to retrieve a new filter coefficient.

At this point in the MAC instruction, the execution unit 22 has used the present invention to perform modulo arithmetic to add an offset to the address used to access circular buffer-X 24. Also, the execution unit 22 has sent the NEW MODULO ADDRESS-X out to the circular buffer- X 24, but the data sample from buffer has not yet been received by the execution unit 22. Likewise, the execution unit 22 has used the present invention to perform modulo arithmetic to add an offset to the address used to access circular buffer-Y 26. Also, the execution unit 22 has sent the NEW MODULO ADDRESS-Y out to the circular buffer-Y 26, but the filter coefficient from the buffer has not yet been received by the execution unit 22.

The next step in the execution of the MAC instruction is to multiply the data sample from circular buffer-X 24 by the filter coefficient from circular buffer-Y 26. The multiply operation is implemented by shifts and additions using the shift register 88 and the ALU 66. The result of this 16 bit by 16 bit fractional multiply is a 31 bit product, due to the nature of the arithmetic operations defined for this particular device. This 31 bit product is then left shifted by 1 place and zero-filled at the least significant bit to produce a 32 bit product.

At the end of the multiply operation, the D accumulator contains the least significant 16 bits of the product and the E accumulator contains the most significant 16 bits of the product. The IZ register 78 contains the old data sample that had been stored in the H register 76 before the multiply operation began. The ML register 82 and the MH register 84 are used to store the 36 bit sum of products. The ML register 82 contains the least significant 16 bits of the sum of products, and the MH register 84 contains the most significant 20 bits of the sum of products. Concatenating the ML register 82 and the MH register 84 results in a 36 bit register called the "M register 90". After each multiply operation has completed, the resulting product is added to the M register in order to keep a running 36 bit summation of all of the multiply operations. This 36 bit sum of products is the value which is then used in various DSP algorithms, such as, for example, filtering algorithms.

While the multiply is being performed, the execution unit 22 receives the new data sample from circular buffer-X 24 and stores that new data sample in the H register 76. Also, the execution unit 22 receives the new filter coefficient from circular buffer-Y 26 and stores that new filter coefficient in the I register 80. The execution unit 22 has now completed the MAC instruction and is also properly initialized to execute another MAC instruction immediately with no register set-up required by the user.

In fact, the "repeat multiply and accumulate" or RMAC instruction allows the programmer to execute the MAC instruction N times where N is an integer between 1 and $2^{15}$. The register initialization instruction which the user must program before the execution of a MAC instruction must also be programmed before the execution of a RMAC instruction. However, unlike the MAC instruction, the RMAC instruction allows the user to perform a large number of multiply and accumulate operations with only one instruction. The execution of one MAC instruction is functionally identical to one iteration of the RMAC instruction, with the following exception: during the RMAC instruction the IZ register 78 does not get loaded with the contents of the H register 76.

In conclusion, the present invention provides a means for performing a restricted form of modulo arithmetic, where the modulo base must be a value equal to 2 to the power X, and where X must be an integer. This invention provides a method and apparatus for performing modulo arithmetic which has many uses, such as, for example, supporting a circular buffer or queue with minimal hardware and without the overhead associated with software boundary tests.

While the present invention has been shown and described with reference to specific embodiments, further modifications and improvements will occur to those skilled in the art. It is to be understood, therefore, that this invention is not limited to the particular forms shown and that it is intended in the appended claims to cover all modifications that do not depart from the spirit and scope of this invention.

We claim:

1. A data processor for performing modulo arithmetic, comprising:
   a first storage circuit which stores a first bit field representing a modulo base value, where said modulo base value must be equal to 2 to the power X, and where X must be a positive integer, the first bit field having a binary value equal to $2^x - 1$;
   a second storage circuit which stores a second bit field representing an offset value;
   a third storage circuit which stores a first modulo value;
   a logic circuit, coupled to said first, second, and third storage circuits, said logic circuit sign-extends the second bit field if the second bit field has fewer bits than the first bit field, said logic circuit logically ANDs each bit of said first bit field to each corresponding bit of said second bit field in order to produce an intermediate value, said logic circuit adds the intermediate value to the first modulo value to produce a second modulo value, while adding the intermediate value to the first modulo value said logic circuit inhibits a carry-out signal to a selected bit location of the second modulo value so that the second modulo value is unaffected by said carry-out signal, the selected bit location being determined by the first bit field.

2. A data processor as in claim 1, wherein said logic circuit comprises:
an arithmetic logic unit coupled to said first, second, and third storage circuits.

3. A data processor as in claim 1, wherein said logic circuit has a first input circuit and a second input circuit, and wherein said data processor further comprises:
a first bus coupled between said first storage circuit and the first input circuit;
a second bus coupled between said second storage circuit and the first input circuit; and
a third bus coupled between said third storage circuit and the second input circuit.

4. A data processor as in claim 1, wherein said third storage circuit stores the second modulo value.

5. A data processor as in claim 1, wherein the first modulo value and the second modulo value are addresses.

6. A data processor as in claim 1, wherein the offset value is determined by a bit field within an instruction.

7. A data processor as in claim 1, further comprising:
a fourth storage circuit, coupled to said logic circuit, which stores a fourth bit field representing a second modulo base value, where said second modulo base value must be equal to 2 to the power X, and where X must be a positive integer;
a fifth storage circuit, coupled to said logic circuit, which stores a fifth bit field representing a second offset value; and
a sixth storage circuit, coupled to said logic circuit, which stores a third modulo value.

8. A digital data processor for performing modulo arithmetic, comprising:
a first storage circuit for storing a first plurality of binary bits which represent a first value, where the first value equals $2^x - 1$, where $2^x$ is a modulo base value, and where X is a positive integer;
a second storage circuit for storing a second plurality of binary bits which represent a second value;
a third storage circuit for storing a modulo address value;
a first logic circuit, coupled to said first and second storage circuits, said first logic circuit ANDing at least a portion of the first plurality of binary bits to a corresponding portion of the second plurality of binary bits, said first logic circuit producing an intermediate value; and
a second logic circuit, coupled to said first logic circuit and to said third storage circuit, said second logic circuit performing an addition operation using the intermediate value and the modulo address value as operands, said second logic circuit generating a next modulo address value, said second logic circuit inhibiting a carry-out signal while performing the addition operation such that a bit location of the carry-out signal is determined by the first plurality of binary bits.

9. A data processor as in claim 8, wherein said first logic circuit comprises:
sign-extension circuitry for sign-extending the second plurality of binary bits, said sign-extension circuitry being coupled to said second storage circuit.

10. A data processor as in claim 8, wherein said first logic circuit comprises:
zero-fill circuitry for zero-filling the intermediate value, said zero-fill circuitry being coupled to said second logic circuit.

11. A method for performing modulo M arithmetic in a digital data processor where M equals $2^x$ and X is a positive integer, the method, comprising the steps of:
transferring a mask value to a logic circuit;
transferring an offset value to the logic circuit;
transferring a first modulo value to the logic circuit;
if the offset value has fewer bits that the mask value, sign-extending the offset value to produce a sign-extended offset value;
performing a logical combination operation using the logic circuit in order to produce an intermediate value, if the offset value has fewer bits than the mask value, the intermediate value is equivalent to the mask value logically ANDed to the sign-extended offset value, and if the offset value does not have fewer bits than the mask value, the intermediate value is equivalent to the mask value logically ANDed to the offset value; and
subsequent to said step of performing a logical combination operation, performing an addition operation using the logic circuit in order to produce a second modulo value;
wherein said step of performing an addition operation comprises the steps of:
using the intermediate value and the first modulo value as operands;
generating a plurality of carry-out signals;
selecting, based upon the mask value, a selected one of the plurality of carry-out signals; and
preventing the selected one of the plurality of carry-out signals from affecting the second modulo value.

12. A method for performing modulo arithmetic as in claim 11, further comprising the step of:
zero-filling the intermediate value.

13. A method for performing modulo arithmetic as in claim 11, wherein said step of performing a logical combination operation comprises the step of:
logically ANDing each bit of the offset value to a corresponding bit of the mask value.

14. A method for performing modulo arithmetic as in claim 11, wherein the offset value is in two's complement form.

15. A method for performing modulo arithmetic as in claim 11, wherein all of said steps are performed in response to receiving an instruction.

16. A method for performing modulo arithmetic as in claim 15, wherein the instruction is a multiply and accumulate instruction.

17. A method for performing modulo arithmetic as in claim 11, wherein N is an integer which is equal to a total number of bits in the mask value, and N is equal to or greater than X, the method further comprising the steps of:
storing X consecutive least significant bits of the mask value in a register, where each of the X consecutive least significant bits of the mask value is equal to one; and storing N minus X consecutive most significant bits of the mask value in the register, where each of the N minus X consecutive most significant bits of the mask value is equal to zero.

18. A method for performing modulo arithmetic as in claim 11, further comprising the steps of:

using the mask value to determine a size of a circular buffer; and addressing the circular buffer using the second modulo value.

19. A method for performing modulo arithmetic as in claim 11, further comprising the steps of:

transferring a second mask value to the logic circuit;

transferring a second offset value to the logic circuit;

performing a second logical combination operation using the logic circuit in order to produce a second intermediate value, the second intermediate value being equivalent to the second mask value logically ANDed to the second offset value;

performing a second arithmetic operation using the logic circuit in order to produce a third modulo value, the third modulo value being equivalent to the second intermediate value added to the second modulo value, the second arithmetic operation being performed subsequent to the second logical combination operation; and selectively preventing the propagation of a second carry out signal during the arithmetic operation.

* * * * *